United States Patent
Shin (10) Patent No.: US 9,350,492 B2
(45) Date of Patent: May 24, 2016

(54) WIRELESS COMMUNICATION APPARATUS AND CONTROL METHOD THEREOF

(71) Applicant: Samsung Electronics Co., Ltd., Suwon (KR)

(72) Inventor: Jong Min Shin, Suwon (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 137 days.

(21) Appl. No.: 14/203,612

(22) Filed: Mar. 11, 2014

(65) Prior Publication Data

US 2014/0376387 A1 Dec. 25, 2014

(30) Foreign Application Priority Data

Jun. 25, 2013 (KR) .................. 10-2013-0072933

(51) Int. Cl.
| | |
|---|---|
| *H04L 1/08* | (2006.01) |
| *H04W 24/04* | (2009.01) |
| *H04L 1/16* | (2006.01) |
| *H04L 1/18* | (2006.01) |
| *H04W 4/06* | (2009.01) |
| *H04W 72/04* | (2009.01) |
| *H04W 88/06* | (2009.01) |
| *H04L 1/00* | (2006.01) |

(52) U.S. Cl.
CPC ............... *H04L 1/08* (2013.01); *H04L 1/0003* (2013.01); *H04L 1/1685* (2013.01); *H04L 1/1896* (2013.01); *H04W 4/06* (2013.01); *H04W 24/04* (2013.01); *H04L 2001/0093* (2013.01); *H04W 72/04* (2013.01); *H04W 88/06* (2013.01)

(58) Field of Classification Search
CPC ....... H04L 1/08; H04L 1/1896; H04L 1/1685; H04L 2001/0093; H04W 24/04; H04W 72/01; H04W 4/06; H04W 88/00–88/08

USPC .......................................................... 370/328
See application file for complete search history.

(56) References Cited

U.S. PATENT DOCUMENTS

| | | | |
|---|---|---|---|
| 7,013,157 | B1 | 3/2006 | Norman et al. |
| 8,351,434 | B1 * | 1/2013 | Fukuda ................. H04L 1/1854 370/278 |
| 2004/0071128 | A1 | 4/2004 | Jang et al. |
| 2004/0184471 | A1 | 9/2004 | Chuah et al. |
| 2006/0291410 | A1 * | 12/2006 | Herrmann ............. H04L 1/1607 370/328 |
| 2007/0127478 | A1 | 6/2007 | Jokela et al. |
| 2012/0155269 | A1 | 6/2012 | Kim et al. |
| 2014/0044205 | A1 | 2/2014 | Kim et al. |

FOREIGN PATENT DOCUMENTS

| | | |
|---|---|---|
| KR | 10-2012-0038606 | 4/2012 |
| KR | 10-1220150 | 1/2013 |
| WO | WO 2012-093828 | 7/2012 |

OTHER PUBLICATIONS

European Search Report mailed Oct. 31, 2014 in corresponding European Application No. 14156656.2-1851.
International Search Report mailed Jun. 26, 2014 in corresponding International Application PCT/KR2014/001237.

* cited by examiner

*Primary Examiner* — Afsar M Qureshi
(74) *Attorney, Agent, or Firm* — Staas & Halsey LLP (57) ABSTRACT

The method of controlling a wireless communication apparatus includes receiving data from a transmitter; transmitting information about transmission of the data to a plurality of receivers; transmitting the data to the plurality of receivers; receiving a response signal about error in receiving the data, from at least one of the plurality of receivers; and retransmitting the data to the plurality of the receivers.

18 Claims, 7 Drawing Sheets

WIRELESS COMMUNICATION APPARATUS AND CONTROL METHOD THEREOF

CROSS-REFERENCE TO RELATED APPLICATIONS

This application claims priority from Korean Patent Application No. 10-2013-0072933, filed on Jun. 25, 2013 in the Korean Intellectual Property Office, the disclosure of which is incorporated herein by reference.

BACKGROUND

1. Field

Apparatuses and methods consistent with the exemplary embodiments relate to a wireless communication apparatus and a control method thereof, and more particularly to a wireless communication apparatus and a control method thereof, which can efficiently transmit data to a plurality of intragroup receivers desired to receive the same data.

2. Description of the Related Art

In a wireless infrastructure network using a wireless access point (AP), multicast transmission methods all perform wireless communication with respect to a wireless AP like a unicast transmission method. However, the multicast transmission method transmits data via not respective channels of 1:1 but the same channel of 1:n channels on the contrary to the unicast transmission method.

Figure 1:
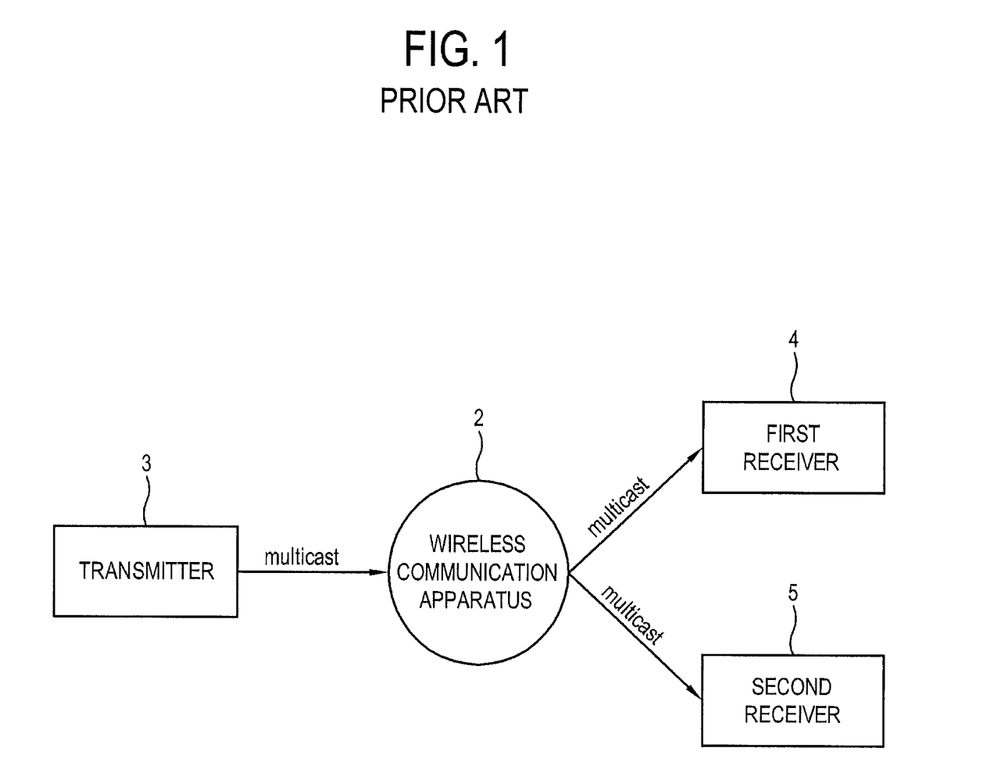
FIG. 1 is an example view showing operations of a conventional wireless communication apparatus.

FIG. 1 is an example showing operations of a wireless communication apparatus in the related art. Referring to FIG. 1, the operations of the conventional wireless communication apparatus will be described.

A transmitter 3 transmits multimedia data to receivers 4 and 5 within a multicast group through wireless communication under an environment of a predetermined space. The transmitter 3 designates destination information as a multicast destination and transmits data to an wireless AP, i.e., a wireless communication apparatus 2 by a multicast method. The wireless communication apparatus 2 transmits the received multicast data to the receivers 4 and 5 within a predetermined space. Basically, in a broadcast transmission method, the multimedia data is transmitted toward the first receiver and the second receiver simultaneously. The receiver within a predetermined space determines whether destination information of data is multicast destination to which a user belongs, and then receives the data normally.

However, in institute of electrical and electronics engineers (IEEE) 802.11 Wi-Fi standards, acknowledgement (ACK, i.e., response to normal reception) is not used at the multicast transmission. This is to prevent repetitive generations of the ACK. However, such nonuse of the ACK brings the following problems.

First, data loss occurs when the receiver cannot receive the multicast data normally, thereby having low reliability.

Second, it is impossible to request the transmitter to do retransmission.

Third, when there is collision between wireless terminals due to simultaneous transmission, a collision avoiding method (IEEE 802.11 standards) is not normally performed since there is no feedback from the ACK.

Fourth, there is irrationality between a unicast transmitter and a multicast transmitter.

Fifth, the lowest modulation method has to be used for the transmission even though intragroup receivers are different in communication environments due to difference in a distance, a communication obstacle, etc., and it is therefore impossible to use a high modulation method for the transmission.

SUMMARY

Additional aspects and/or advantages will be set forth in part in the description which follows and, in part, will be apparent from the description, or may be learned by practice of the invention.

One or more exemplary embodiments may provide a wireless communication apparatus and a control method thereof, which transmits information about transmission of data, received from the transmitter, to a plurality of receivers; transmits the data received from the transmitter to the plurality of receivers; and retransmits the data to the plurality of receivers when a response signal about an error in receiving the data is received from at least one among the plurality of receivers.

According to an aspect of another exemplary embodiment, a method of controlling a wireless communication apparatus may include: receiving data from a transmitter; transmitting information about transmission of the data to a plurality of receivers; transmitting the data to the plurality of receivers; receiving a response signal about error in receiving the data, from at least one of the plurality of receivers; and retransmitting the data to the plurality of receivers.

The receiving the data from the transmitter may include receiving the data including destination information about the plurality of receivers and response information about acknowledgement.

The receiving the data may include transmitting a response signal about acknowledgement of the data to the transmitter.

The transmitting the data to the plurality of receivers may include measuring a state of communication with the plurality of receivers.

The transmitting the data to the plurality of receivers may include transmitting the data including response information about acknowledgement to one receiver among the plurality of receivers based on measured results.

The transmitting the data including the response information may include receiving a response signal about acknowledgement of the data from the one receiver.

The transmitting information about transmission of the data may include receiving a response signal about acknowledgement or a reception error of the data from at least one among the plurality of receivers different from the one receiver.

The receiving the response signal about the acknowledgement or the reception error of the data may include transmitting information about a response signal corresponding to the acknowledgement or the reception error to the plurality of receivers.

The retransmitting the data to the plurality of receivers may include transmitting the data including a response signal about acknowledgement of the data to a receiver corresponding to a received response signal if destination information of the receiver corresponding to the received response signal is matched with one among the destination information received from the transmitter.

According to an aspect of another exemplary embodiment, a wireless communication apparatus may include: a communicator which can transmit and receive data; and a controller which controls the communicator to transmit information about transmission of data to a plurality of receivers if the data is received from a transmitter, transmit the data to the plurality of receivers, and retransmit the data to the plurality of receivers if a response signal about error in receiving the data is received from at least one among the plurality of receivers.

The controller may receive the data including destination information about the plurality of receivers and response information about acknowledgement.

The controller may transmit a response signal about acknowledgement of the data to the transmitter.

The controller may measure a state of communication with the plurality of receivers.

The controller may transmit the data including response information about acknowledgement to one receiver among the plurality of receivers based on measured results.

The controller may receive a response signal about acknowledgement of the data from the one receiver.

The controller may receive a response signal about acknowledgement or a reception error of the data from at least one among the plurality of receivers different from the one receiver.

The controller may transmit information about a response signal corresponding to the acknowledgement or the reception error to the plurality of receivers.

The controller may transmit the data including a response signal about acknowledgement of the data to a receiver corresponding to a received response signal if destination information of the receiver corresponding to the received response signal is matched with one among the destination information received from the transmitter.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Reference will now be made in detail to the embodiments, examples of which are illustrated in the accompanying drawings, wherein like reference numerals refer to the like elements throughout. The embodiments are described below to explain the present invention by referring to the figures.

Below, exemplary embodiments will be described in detail with reference to accompanying drawings. Exemplary embodiments may be achieved in various forms and not limited to examples set forth herein. For convenience of description, parts that are not directly related to the exemplary embodiments are omitted, and like numerals refer to the same or similar elements throughout.

Figure 2:
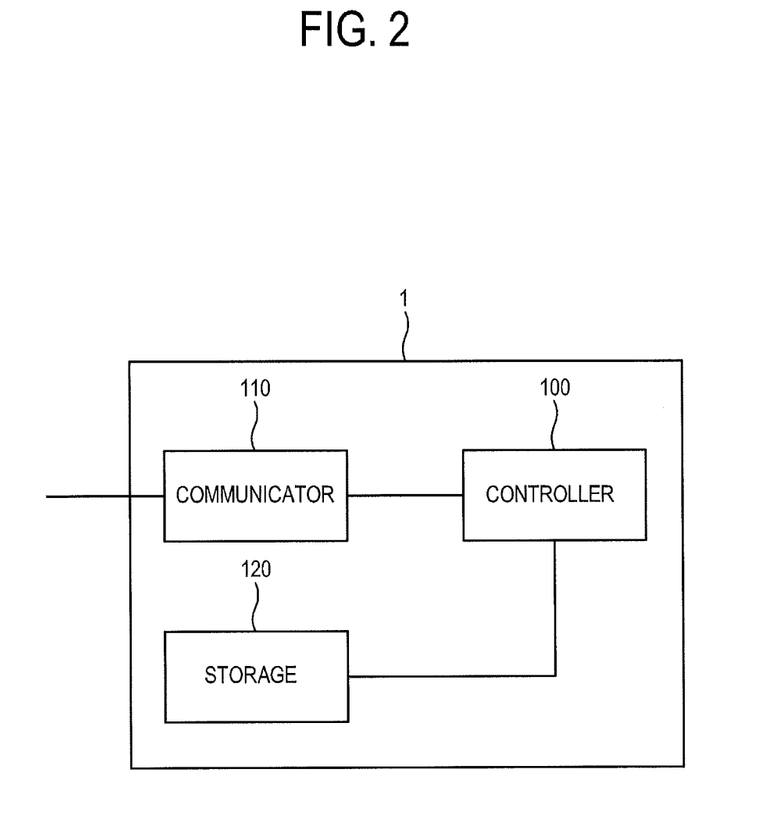
FIG. 2 is a block diagram showing a wireless communication apparatus according to an exemplary embodiment.

FIG. 2 is a block diagram showing a wireless communication apparatus according to an exemplary embodiment. As shown in FIG. 2, the wireless communication apparatus 1 according to an exemplary embodiment may include a communicator 110, a storage 120, and a controller 100.

The communicator 110 may receive a wireless signal in accordance with preset wireless communication standards, or a wired signal from a corresponding external input as various external input cables are connected.

The communicator 110 may include a plurality of connectors (not shown) to which cables are individually connected. The communicator 110 may receive a signal from a connected external input, for example, a broadcasting signal, a video signal, a data signal, etc. according to a high definition multimedia interface (HDMI), a universal serial bus (USB), and component standards, or may receive communication data through a communication network.

The communicator 110 may include not only a configuration for receiving a signal/data from an external input, but also various additional configurations such as a wireless communication module (not shown) for wireless communication or a tuner (not shown) for being tuned to a broadcasting signal in accordance with designs of the wireless communication apparatus 1. The communicator 110 may not only receive a signal from the external device but also transmit information/data/signal of the wireless communication apparatus to external device (not shown). That is, the communicator 110 is not limited to only the configuration for receiving a signal from the external device, but may be achieved by an interface for interactive communication. The communicator 110 may receive control signals for selecting a user interface (UI) from a plurality of control device. The communicator 110 may be configured with a communication module for short-range wireless communication, such as a Bluetooth, infrared (IR), ultra wideband (UWB), Zigbee, etc., or may be configured with a publicly known communication port for wired communication. The communicator 110 may be used for various purposes of transmitting/receiving a command, data, etc. for controlling a display, in addition to the control signal for selecting the UI.

Figure 4:
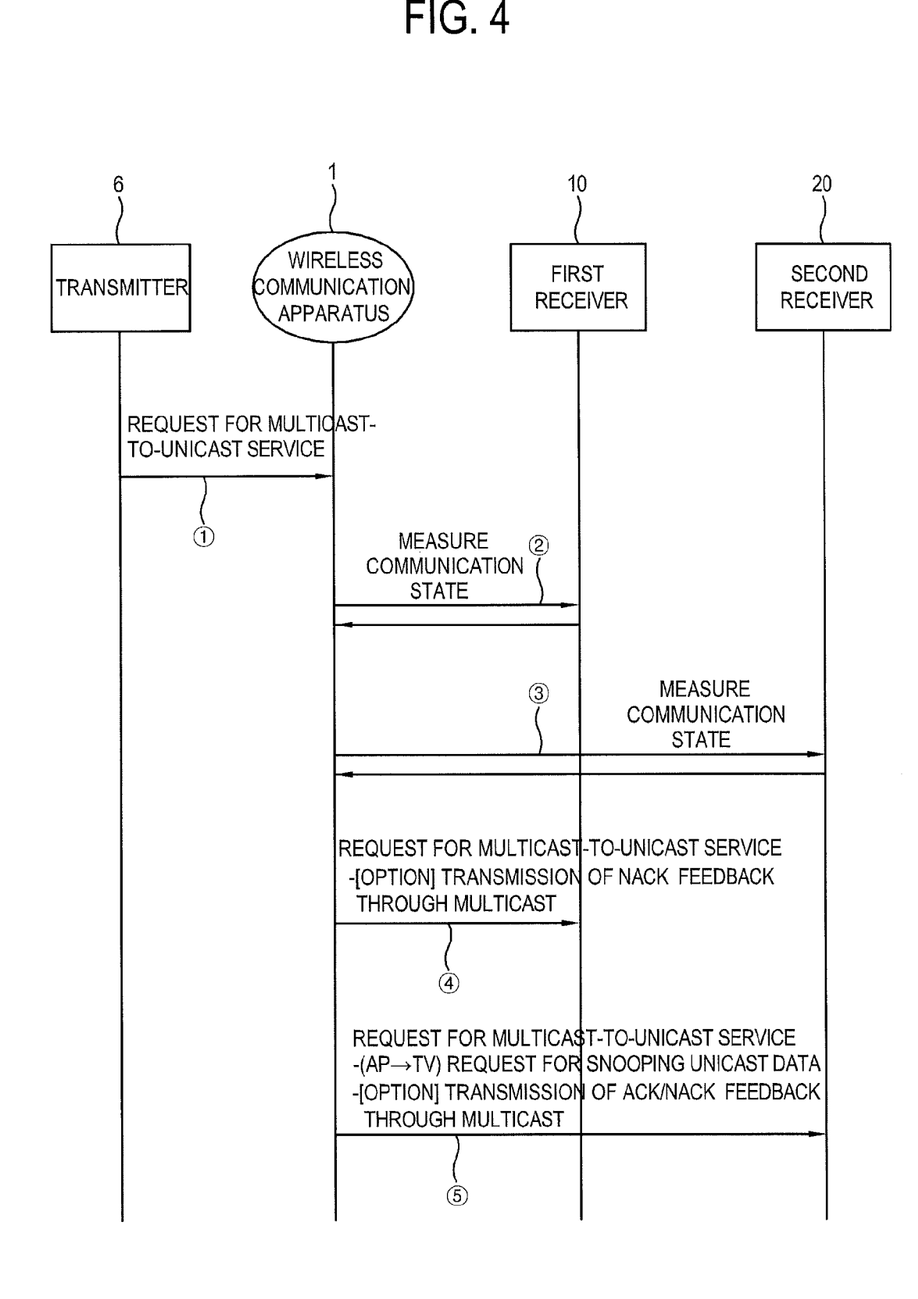
FIG. 4 is an example view showing operations for transmitting data from a transmitter to the plurality of receivers through the wireless communication apparatus according to an exemplary embodiment.
Figure 5:
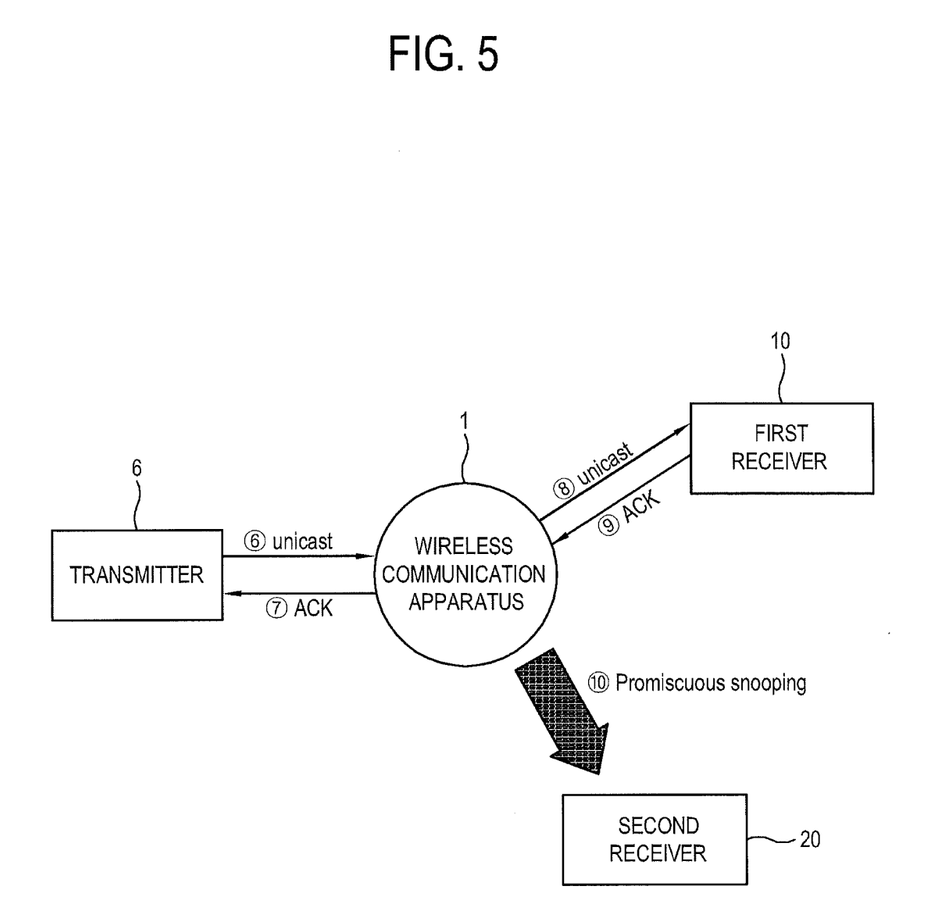
FIG. 5 is an example view showing operations of the wireless communication apparatus according to an exemplary embodiment.

The storage 120 may be a non-volatile memory (e.g., a writable read only memory (ROM) from which data has not to be deleted even though the wireless communication apparatus 1 is turned off and on which matters changed by a user can be reflected. That is, the storage 120 may be one among a flash memory, an erasable and programmable ROM (EPROM), or an electrically erasable and programmable ROM (EEPROM). The storage 120 may store data received from the transmitter 6 (as shown in FIGS. 4-5), and/or store various control signals and provide them to the controller 100.

The controller 100 may control the communicator 110 to transmit information about data transmission to the plurality of receivers 10, 20, 30, ..., n when receiving data from the transmitter 6; transmit the received data to the plurality of receivers 10, 20, 30, ..., n; and retransmit the data to the plurality of receivers 10, 20, 30, ..., n when a response signal about an error in receiving the data is received from at least one among the plurality of receivers 10, 20, 30, ..., n.

The controller 100 may receive data including destination information about the plurality of receivers 10, 20, 30, ..., n and response information about acknowledgement. The destination information may include an Internet protocol (IP) address and a media access control (MAC) address of the plurality of receivers set up in the transmitter 6, and include an address as long as it can be used in transmitting data to the receivers 10, 20, 30, ..., n. The response information about acknowledgement is a control signal as acknowledgement (ACK) signal for informing that the receivers 10, 20, 30, ..., n normally received data without any error, and informing the transmitter 6 that transmission is enabled. The receivers 10, 20, 30, ..., n have to indispensably make a response. Through the response information for such normal reception (acknowledgement), it is possible to determine that the transmitter 6 transmits data to the receivers 10, 20, 30, ..., n and the receivers 10, 20, 30, ..., n normally receive data, thereby improving reliability on transmitting the data.

The controller 100 may transmit a response signal about acknowledgement of data to the transmitter 6. Through the foregoing ACK signal, the transmitter 6 can be informed of the acknowledgement.

The controller 100 may measure a communication state with regard to the plurality of receivers 10, 20, 30, ..., n. The controller 100 uses the destination information about the receivers 10, 20, 30, ..., n, received from the transmitter 6, to measure the communication state with regard to the receivers 10, 20, 30, ..., n, and thus sorts the receiver having the worst communication environment. The communication state may be varied depending on a distance from the receivers 10, 20, 30, ..., n, presence of a communication obstacle, etc. Therefore, data can be transmitted by setting up a modulation method, i.e., a communication bit ratio with respect to the farthest receiver or the receiver having the worst communication state due to the communication obstacle.

The controller 100 transmits data including the response information about acknowledgement to at least one receiver among the plurality of receivers 10, 20, 30, ..., n based on the measured state results of communication with the receivers 10, 20, 30, ..., n. The controller 100 may receive the response signal about acknowledgement of the transmission data from any one of the receivers. It is possible to check whether the data is normally transmitted to and received in the receiver by receiving the response signal about the acknowledgement based on the response information about acknowledgement.

The controller 100 may receive the response signal about acknowledgement of or an error in receiving the data from at least one among the plurality of receivers 10, 20, 30, ..., n different from the one receiver. The receivers 10, 20, 30, ..., n may selectively receive a lot of transmitted wireless signals. Also, the receivers 10, 20, 30, ..., n may normally receive data by checking up whether is same the destination information of the receivers 10, 20, 30, ..., n based on data of the destination information, and may selectively receive a broadcast. For example, the receiver may watch a broadcasting channel using digital multimedia broadcasting (DMB) service.

For example, a user may take an image using the transmitter 6, or transmit taken image data to the receivers 10, 20, 30, ..., n of members of a group to which s/he belongs in order to share the taken image data. If the image data is transmitted by a multicast method, there may be the receivers 10, 20, 30, ..., n that cannot receive the image data. On the other hand, if the image data is transmitted by a unicast method, messages about the normal reception and the reception error as many as the number of receivers 10, 20, 30, ..., n are fed back to the transmitter 6, and it is inconvenient to process the feedback signal.

Although the data is transmitted to one receiver by the unicast method, the receivers 10, 20, 30, ..., n including the one receiver and placed at receivable positions can receive the data. Here, information about transmission of data to one receiver is previously given to the plurality of receivers 10, 20, 30, ..., n different from the one receiver, the feedback of normal reception (acknowledgement) may be excluded, and only the receivers 10, 20, 30, ..., n of the reception error may be sorted.

The controller 100 may transmit information about the response signal of acknowledgement or a reception error to the plurality of receivers 10, 20, 30, ..., n. It may be a case that the plurality of receivers 10, 20, 30, ..., n different from the one receiver are informed of the transmission of data to the one receiver.

The controller 100 may transmit data including the response signal about the acknowledgement of the data to the receivers 10, 20, 30, ..., n corresponding to the received response signal if the destination information of the receivers 10, 20, 30, ..., n corresponding to the received response signal is matched with one among the destination information received from the transmitter 6. If the message (i.e., the response signal) about the reception error is received from the receivers 10, 20, 30, ..., n, and the destination information received from the transmitter 6 is checked up matching and if match, the data can be transmitted to the receivers 10, 20, 30, ..., n by the broadcast method, the multicast method or the unicast method. This may be determined by a control signal for setting up the transmission method contained in the data received from the transmitter 6.

Figure 3:
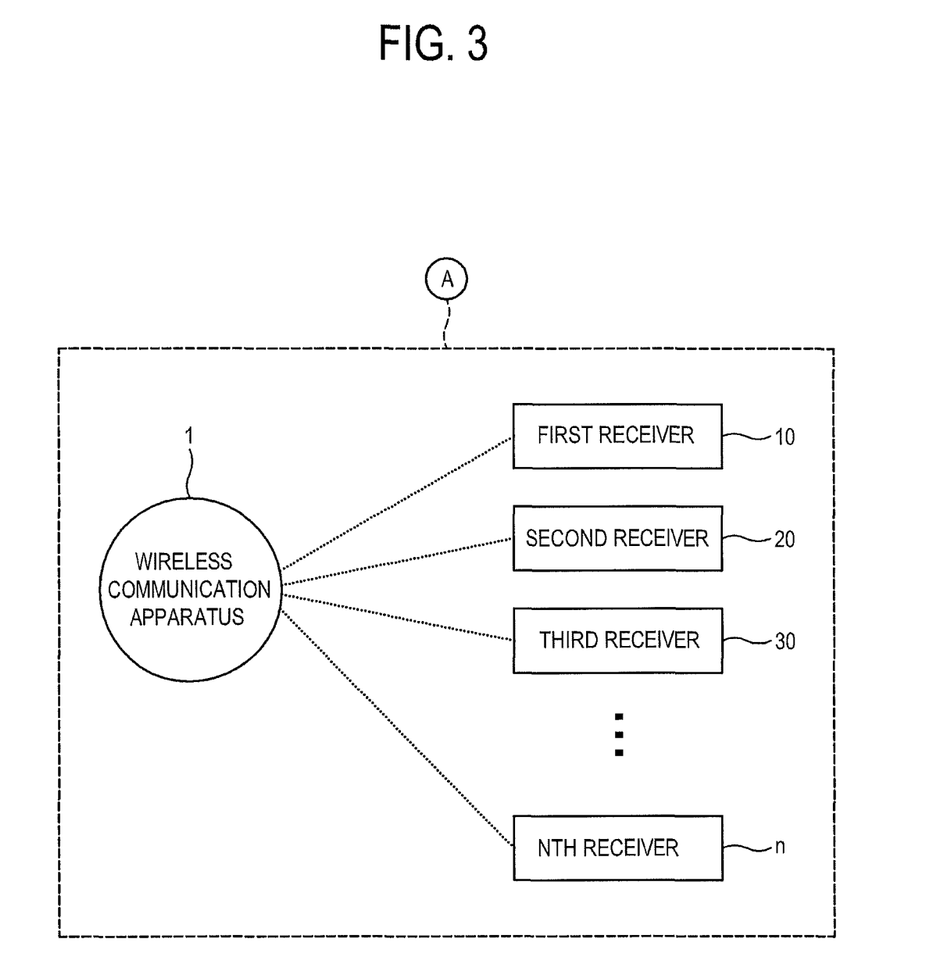
FIG. 3 is an example view showing a wireless communication apparatus and a plurality of receivers according to an exemplary embodiment.

FIG. 3 is an example view showing the wireless communication apparatus 1 and the plurality of receivers 10, 20, 30, ..., n according to an exemplary embodiment.

The wireless communication apparatus 1 shown in FIG. 3 is capable of transmitting data to a first receiver 10, a second receiver 20, a third receiver, the Nth receiver. "A" refers to a group based on the setup destination information from the transmitter 6. For example, a user of the transmitter 6 may set up the group with friends, colleagues, families, etc. with which s/he wants to share data, and set up to share a scene image of hooking up a big fish with members of an angler's club.

FIG. 4 is an example view showing operations for transmitting data from the transmitter 6 to the plurality of receivers 10, 20, 30, ..., n through the wireless communication apparatus 1 according to an exemplary embodiment. Referring to FIG. 4, operations of transmitting data from the transmitter 6 to the plurality of receivers 10, 20, 30, ..., n through the wireless communication apparatus 1 according to an exemplary embodiment will be described. Here, the transmitter 6 may be a set-top box, the first receiver 10 may be a TV, and the second receiver 20 may be a Smart phone. However, it is not limited thereto.

The transmitter 6 (i.e., the set-top box) requests unicast service for multicast.

The wireless communication apparatus 1 measures a communication state of the first receiver 10 through the destination information.

A communication state of the second receiver 20 is measured.

The wireless communication apparatus 1 requests the first receiver 10 (TV) to provide the unicast service for multicast. In this case, data including the response information about a reception error is transmitted to determine whether reception is normal.

The wireless communication apparatus 1 requests the second receiver 20 (e.g., Smart phone) to provide the unicast service for multicast. This is to transmit information about the transmission of data to the first receiver 10. That is, it is to snoop and share data transmitted to the TV while data is transmitted to the first receiver 10, i.e., the TV. In this case, data including the response information about acknowledgement and a reception error is transmitted to determine whether the reception is normal.

FIG. 5 is an example view showing operations of the wireless communication apparatus 1 according to an exemplary embodiment. That is, an operation of transmitting data after the operations of FIG. 4 will be described.

The transmitter 6, i.e., the set-top box transmits data including the response information about one destination information, that is, the destination information of the first receiver 10 (i.e., TV) and the acknowledgement to the wireless communication apparatus 1.

The wireless communication apparatus 1 transmits the response signal about normal reception (acknowledgement), i.e., an ACK signal to the transmitter 6 (e.g., set-top box).

The wireless communication apparatus 1 transmits data including the response information about the acknowledgement to the first receiver 10 (e.g., TV).

The first receiver 10 (e.g., TV) transmits the response signal about normal reception (acknowledgement), i.e., an ACK signal to the wireless communication apparatus 1.

The wireless communication apparatus 1 transmits data including the response information about a reception error to the second receiver 20.

Although it is not shown, if the second receiver 20 does not receive any data, the second receiver 20 transmits the response signal about the reception error to the wireless communication apparatus 1. Thus, the wireless communication apparatus 1 receives a message about the reception error (i.e., the response signal) from the receiver and determines whether it is matched with the destination information received from the transmitter 6, thereby transmitting data to the receiver by the broadcast transmission method, the multicast transmission method or the unicast transmission method when it is matched.

Figure 6:
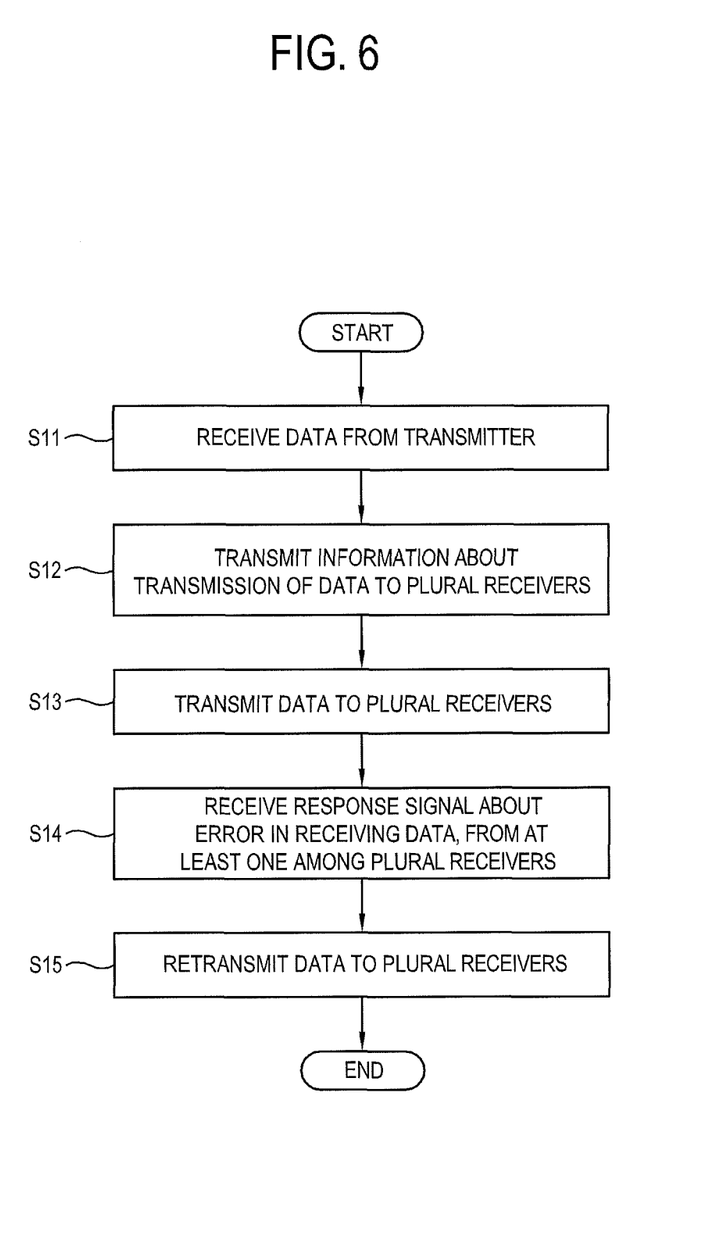
FIG. 6 is a control flowchart showing operations of the wireless communication apparatus according to an exemplary embodiment.

FIG. 6 is a control flowchart showing operations of the wireless communication apparatus 1 according to an exemplary embodiment. Referring to FIG. 6, operations of the wireless communication apparatus according to an exemplary embodiment will be described.

Data is received from the transmitter 6 (S11). The wireless communication apparatus 1 transmits information, which data is transmitted to one receiver, to the plurality of receivers 10, 20, 30, . . . , n (S12). The wireless communication apparatus 1 transmits the data from the transmitter 6 to the plurality of receivers 10, 20, 30, . . . , n (S13). The wireless communication apparatus 1 receives the response signal about the error in receiving the data from at least one receiver among the plurality of receivers 10, 20, 30, . . . , n (S14). The wireless communication apparatus 1 retransmits the data received from the transmitter 6 to the plurality of receivers 10, 20, 30, . . . , n based upon the response signal about error (S15).

Figure 7:
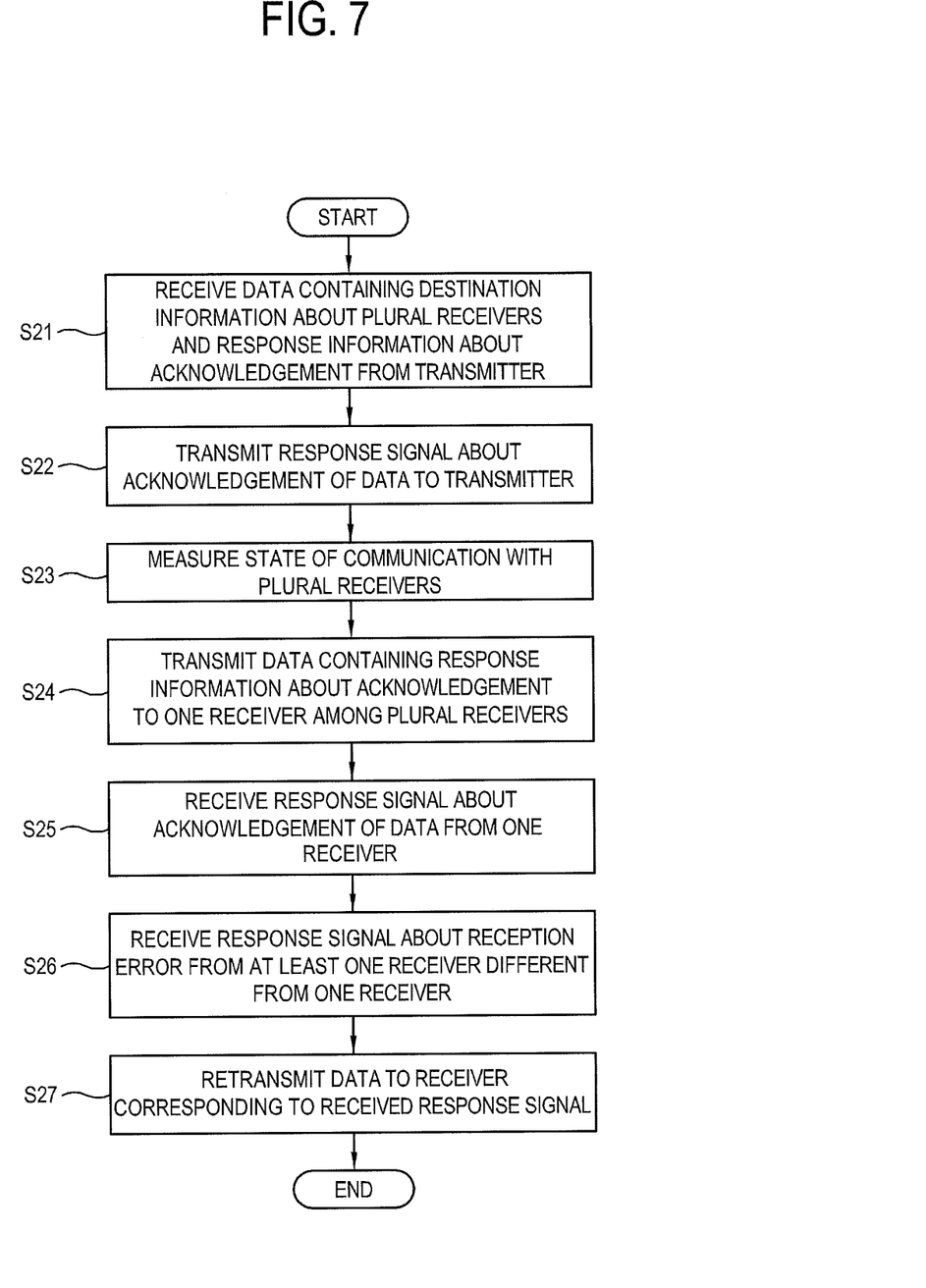
FIG. 7 is a control flowchart showing operations of the wireless communication apparatus according to an exemplary embodiment.

FIG. 7 is a control flowchart showing operations of the wireless communication apparatus 1 according to an exemplary embodiment. Referring to FIG. 7, operations of the wireless communication apparatus according to an exemplary embodiment will be described.

Data including the destination information about the plurality of receivers 10, 20, 30, . . . , n and the response information about acknowledgement is received from the transmitter 6 (S21). The response signal (e.g., an ACK signal) about acknowledgement of data is transmitted to the transmitter 6 (S22). The wireless communication apparatus 1 measures a state of communication with the plurality of receivers 10, 20, 30, . . . , n (S23). Based on the measured communication state, the farthest receiver or the receiver having the worst communication state is sorted, and a modulation method, i.e., a communication bit ratio is set up with respect to the worst receiver. The wireless communication apparatus 1 transmits data including the response information about acknowledgement to the receiver having the worst communication environment among the plurality of receivers 10, 20, 30, . . . , n (S24). The response signal (i.e., ACK signal) about the acknowledgement of the transmitted data is received from the receiver having the worst communication environment (S25). The response signal (i.e., NACK signal) about the reception error is received from at least one receiver different from the receiver having the worst communication environment (S26). The data is retransmitted to the receiver corresponding to the received response signal (S27).

Through the wireless communication apparatus 1, information about transmission of data, received from the transmitter 6, is transmitted to the plurality of receivers 10, 20, 30, . . . , n; and the data received from the transmitter 6 is transmitted to the plurality of receivers 10, 20, 30, . . . , n, thereby preventing data loss as a receiver can normally receive the data, and thus securing reliability. Further, the transmitter may be requested for retransmission. When collision occurs due to simultaneous transmission between the wireless communication apparatus 1, a reception error may be fed back. It is possible to prevent irrationality between transmission methods of the transmitter 6. Although the receivers of the destination information are different in communication environments due to difference in a distance, a communication obstacle, etc., it is impossible preferably not to a high modulation method for the transmission.

According to an exemplary embodiment, information about transmission of data from the transmitter is transmitted to the plurality of receivers, and the data from the transmitter is transmitted to the plurality of receivers, thereby having the following effects:

First, the receiver receives the data normally, so that data loss can be prevented, thereby having high reliability.

Second, the transmitter may be requested to do retransmission.

Third, when collision occurs due to simultaneous transmission between the wireless communication apparatus 1, a reception error may be fed back.

Fourth, it is possible to prevent irrationality between transmission methods of the transmitter 6.

Fifth, although the receivers of the destination information are different in communication environments due to difference in a distance, a communication obstacle, etc., it is preferable not to use a high modulation method for the transmission The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A method of controlling a wireless communication apparatus, the method comprising:
    receiving data and information about a transmission of the data from an external transmitter;
    transmitting the received information about the transmission of the data to a plurality of receivers;
    transmitting the data to the plurality of receivers;
    receiving a response signal about error in receiving the data, from at least one of the plurality of receivers; and
    retransmitting the data to the plurality of receivers.

2. The method according to claim 1, wherein the data comprises destination information about the plurality of receivers and response information about acknowledgement.

3. The method according to claim 2, wherein the receiving the data comprises transmitting a response signal about acknowledgement of the data to the external transmitter.

4. The method according to claim 1, wherein the transmitting the data to the plurality of receivers comprises checking a state of communication with the plurality of receivers.

5. The method according to claim 4, wherein the transmitting the data to the plurality of receivers comprises transmitting the data comprising response information about acknowledgement to one receiver among the plurality of receivers based on checked results.

6. The method according to claim 3, wherein the transmitting the data comprising the response information comprises receiving a response signal about acknowledgement of the data from the one receiver.

7. The method according to claim 1, wherein the transmitting information about transmission of the data comprises receiving a response signal about acknowledgement or a reception error of the data from at least one among the plurality of receivers different from the one receiver.

8. The method according to claim 7, wherein the receiving the response signal about the acknowledgement or the reception error of the data comprises transmitting information about a response signal corresponding to the acknowledgement or the reception error to the plurality of receivers.

9. The method according to claim 1, wherein the retransmitting the data to the plurality of receivers comprises transmitting the data including a response signal about acknowledgement of the data to a receiver corresponding to a received response signal if destination information of the receiver corresponding to the received response signal is matched with one among the destination information received from the external transmitter.

10. A wireless communication apparatus comprising:
    a communicator which can transmit and receive data, wherein the communicator is arranged to receive data from an external transmitter and transmit the data to a plurality of receivers, and wherein the communicator is arranged to receive information about transmission of the data from the external transmitter; and
    a controller which controls the communicator to transmit the information about the transmission of the data to the plurality of receivers if the data is received from the external transmitter, transmit the data to the plurality of receivers, and retransmit the data to the plurality of receivers if a response signal about error in receiving the data is received from at least one among the plurality of receivers.

11. The wireless communication apparatus according to claim 10, wherein the data comprises destination information about the plurality of receivers and response information about acknowledgement.

12. The wireless communication apparatus according to claim 11, wherein the controller transmits a response signal about acknowledgement of the data to the external transmitter.

13. The wireless communication apparatus according to claim 10, wherein the controller checks a state of communication with the plurality of receivers.

14. The wireless communication apparatus according to claim 13, wherein the controller transmits the data including response information about acknowledgement to one receiver among the plurality of receivers based on checked results.

15. The wireless communication apparatus according to claim 12, wherein the controller receives a response signal about acknowledgement of the data from the one receiver.

16. The wireless communication apparatus according to claim 10, wherein the controller receives a response signal about acknowledgement or a reception error of the data from at least one among the plurality of receivers different from the one receiver.

17. The wireless communication apparatus according to claim 16, wherein the controller transmits information about a response signal corresponding to the acknowledgement or the reception error to the plurality of receivers.

18. The wireless communication apparatus according to claim 10, wherein the controller transmits the data comprising a response signal about acknowledgement of the data to a receiver corresponding to a received response signal if destination information of the receiver corresponding to the received response signal is matched with one among the destination information received from the external transmitter.

* * * * *